Feb. 1, 1966 W. E. KUHN 3,232,706
METHOD OF MAKING SUBMICRON SIZE NITRIDES AND CARBIDES
Filed May 1, 1961 4 Sheets-Sheet 1

INVENTOR.
WILLIAM E. KUHN
BY
KW Brownell
ATTORNEY

INVENTOR.
WILLIAM E. KUHN

INVENTOR.
WILLIAM E. KUHN
BY
*K W Brownell*
ATTORNEY

INVENTOR.
WILLIAM E. KUHN
ATTORNEY

United States Patent Office 3,232,706
Patented Feb. 1, 1966

3,232,706
METHOD OF MAKING SUBMICRON SIZE
NITRIDES AND CARBIDES
William E. Kuhn, Niagara Falls, N.Y., assignor to The Carborundum Company, Niagara Falls, N.Y., a corporation of Delaware
Filed May 1, 1961, Ser. No. 106,595
9 Claims. (Cl. 23—191)

This invention relates to the manufacture of particulate refractory materials having submicron particle sizes. More particularly, it relates to a novel method of producing such materials by a vapor phase reaction, and the novel apparatus used therein.

The properties and uses of refractory materials are well known to the art. With the expanding need for materials capable of withstanding high temperatures, the interest in refractory materials has been rapidly increasing. Concurrently, the applications to which the refractory materials can be put has been expanding. Generally speaking, the refractory materials now manufactured and sold have relatively large particle sizes. For example, grain sizes ranging from 30 grit to 1000 grit are quite common. Even to produce such relatively large grains, expensive and time-consuming crushing and grinding operations are required.

Many applications have been suggested for refractory materials having submicron particle sizes. For example, high-density refractories can be made with the submicron materials because of the ability of the small particles to fill submicron pores. Lightweight insulation can be prepared from such materials because of the extremely low bulk density of such materials. The particulate material lends itself to use as a polishing agent because its fine size and platelike particles provide high rates of stock removal with minimum surface scratching and damage. The fine materials are good as pigments for paints and the like since the particle size provides excellent covering and rheological properties. However, use in these manners has been seriously restricted due to the inability to produce such materials at a reasonable cost. Small quantities of particulate refractories having submicron grain sizes have been prepared by comminution of large grains of the same refractory. But the expense involved in such manufacturing methods makes the materials commercially unattractive.

This invention provides a process and apparatus for the direct production of the particulate refractories which will make the production of such material commercially attractive. Briefly stated, the process of this invention comprises feeding finely divided reactants in loose, pelletized solid form to a high temperature reaction zone created between non-consumable electrodes in an enclosure of restricted volume. The reactants are vaporized by the thermal energy generated by the high temperature arc and the resulting vapors are reacted with each other or with a gaseous environment in the reaction zone to form a particulate refractory material having submicron particle sizes.

The novel apparatus utilized in this process is a furnace or reactor having a small, gas-tight reaction chamber. Electrodes, one of which may be a wall of the reaction chamber, provide a high temperature arc in the reaction chamber. A feed system introduces the pelletized reactants in finely divided solid form at a controlled rate to maintain the arc and voltage relatively constant. An outlet tube carries the reaction products to a collection system.

The features and advantages of the present invention will become more fully apparent from consideration of the following description thereof taken in conjunction with the appended drawings, in which.

PROCESS DESCRIBED

In utilizing the process of this invention, reactants are fed into an enclosure of restricted volume provided by a furnace or reactor. At least one of the reactants is a solid in finely-divided, pelletized or granular form. All of the reactants may be fed to the furnace in granular form; however, in the manufacture of some refractory materials it is desirable to utilize a gaseous reactant. The physical form of the reactants will be largely determined by the physical form of the raw materials. For example, in the manufacture of boron nitride, boric oxide is reacted with a nitrogen-containing compound such as ammonia in the following manner:

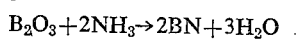
$$B_2O_3 + 2NH_3 \rightarrow 2BN + 3H_2O$$

Since it is readily available in gaseous form it is preferable to utilize gaseous ammonia as one of the reactants. On the other hand, silicon carbide is prepared by reacting silica with carbon in the following manner:

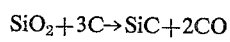
$$SiO_2 + 3C \rightarrow SiC + 2CO$$

The best physical form for the reactants necessary in making other refractory carbides, nitrides, borides, silicides and oxides in accordance with this invention will be readily apparent to those skilled in the art.

The solid reactant or reactants are vaporized in a high temperature reaction zone in the furnace created by and between two non-consumable electrodes. The vaporized reactants react with each other or a gaseous reactant introduced into the reaction zone to form a finely divided refractory material. The particulate refractory material which is predominately of submicron crystal and grain sizes is swept from the furnace by expanding gases formed by the reaction or by an inert sweep gas introduced to the furnace for that purpose or both. The solid particulate refractory materials may then be separated from the sweep gases and subjected to the desired finishing operations.

Figure 2:
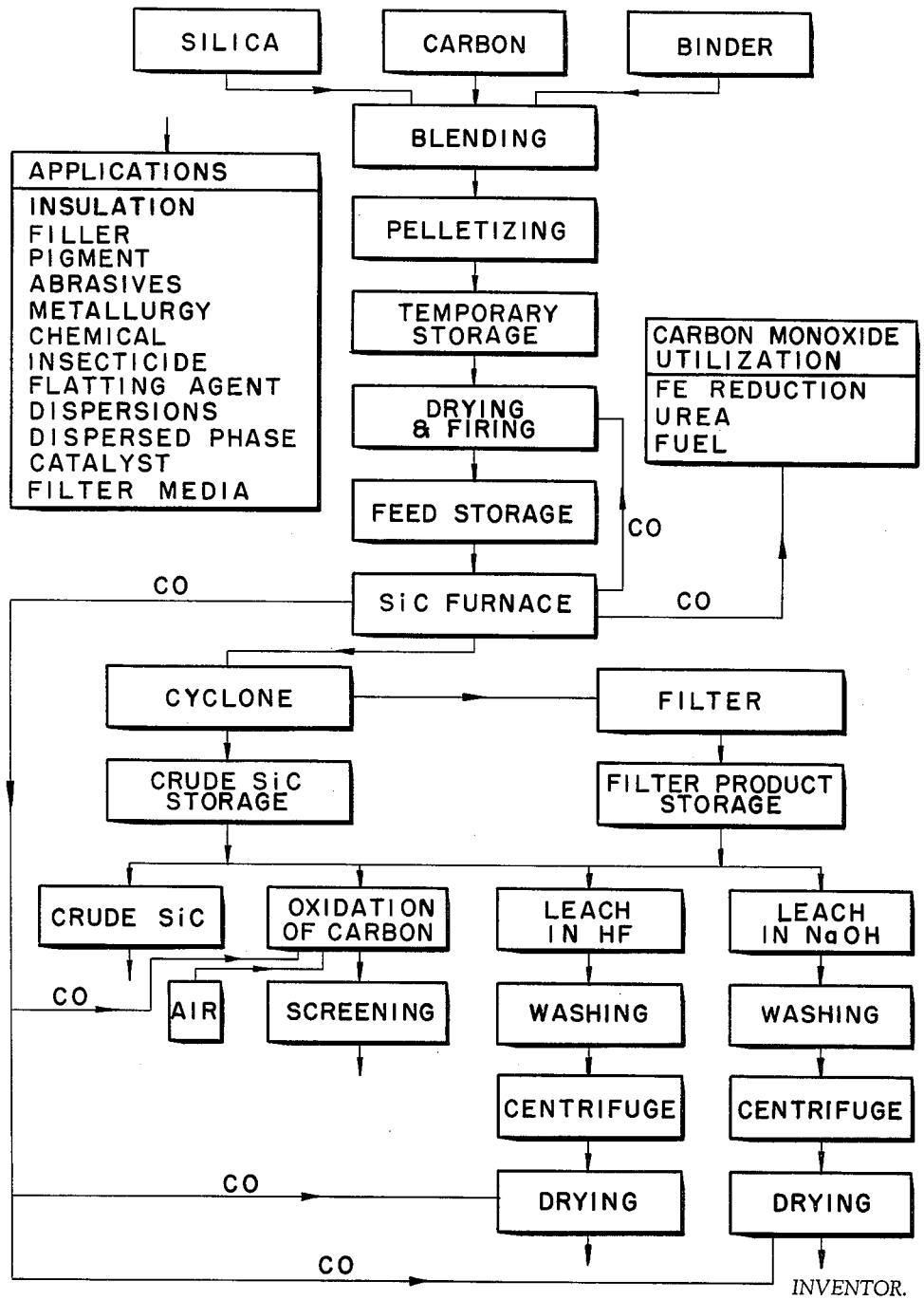
FIGURE 2 is a schematic flow diagram illustrating the process of this invention as specifically applied to the production of particulate silicon carbide of submicron particle size.

In FIGURE 2 of the drawings a schematic flow diagram is shown illustrating the manufacture of particulate silicon carbide utilizing the process of this invention and the process will be described in relation thereto. As described above, the raw materials utilized in the preparation of silicon carbide are silica and carbon. These materials are fed to a blending machine in approximately stoichiometric proportions together with a binder such as phenolic resin. After blending the admixture is pelletized by any suitable means such as a rotating drum. The resulting pellets are dried by any suitable means such as hot combustion gases or infra-red heating lamps. The dried pellets are then fired or baked at a higher temperature and transferred to storage for subsequent metering into the furnace.

The pellets containing silica and carbon are fed to the furnace where they are vaporized by the thermal energy created by the high temperature arc. The vapors react to form particulate silicon carbide. The submicron silicon carbide is swept from the furnace by expanding carbon monoxide gas formed in the furnace.

In addition to silicon carbide and carbon monoxide, the effluent from the furnace may contain some particulate silica and carbon. This effluent is passed through one or more cyclone separators in which most of the silicon carbide is recovered. The fines from the cyclone may be passed through a filter wherein substantially all of the remainder of the product is recovered or, in certain instances, may be fed back to the furnace directly or to the feed storage chamber and re-circulated through the furnace.

The crude silicon carbide may be used directly in many applications, for example, as a polishing abrasive, insulation, pigment for paints or the like, filler, abrasive, insecticide, flatting agent, catalyst carrier, filter media, chemical intermediate, and in metallurgy.

For some of the above enumerated applications, a more pure product may be required. Thus, the crude products may be subjected to controlled oxidation to remove carbon followed by a screening operation. Similarly, the crude products may be leached in hydrofluoric acid to remove excess silica and fibrous material or may be leached with alkali. After leaching, the product is washed, centrifuged and dried.

The carbon monoxide formed during the reaction may be recovered and utilized in a number of ways. It may be used in the process in drying and baking the pelletized feed or to dry the leached and washed product. It also may be used in an independent process, for example, as a reactant in the synthesis of an organic compound such as urea.

APPARATUS DESCRIBED

Figure 1:
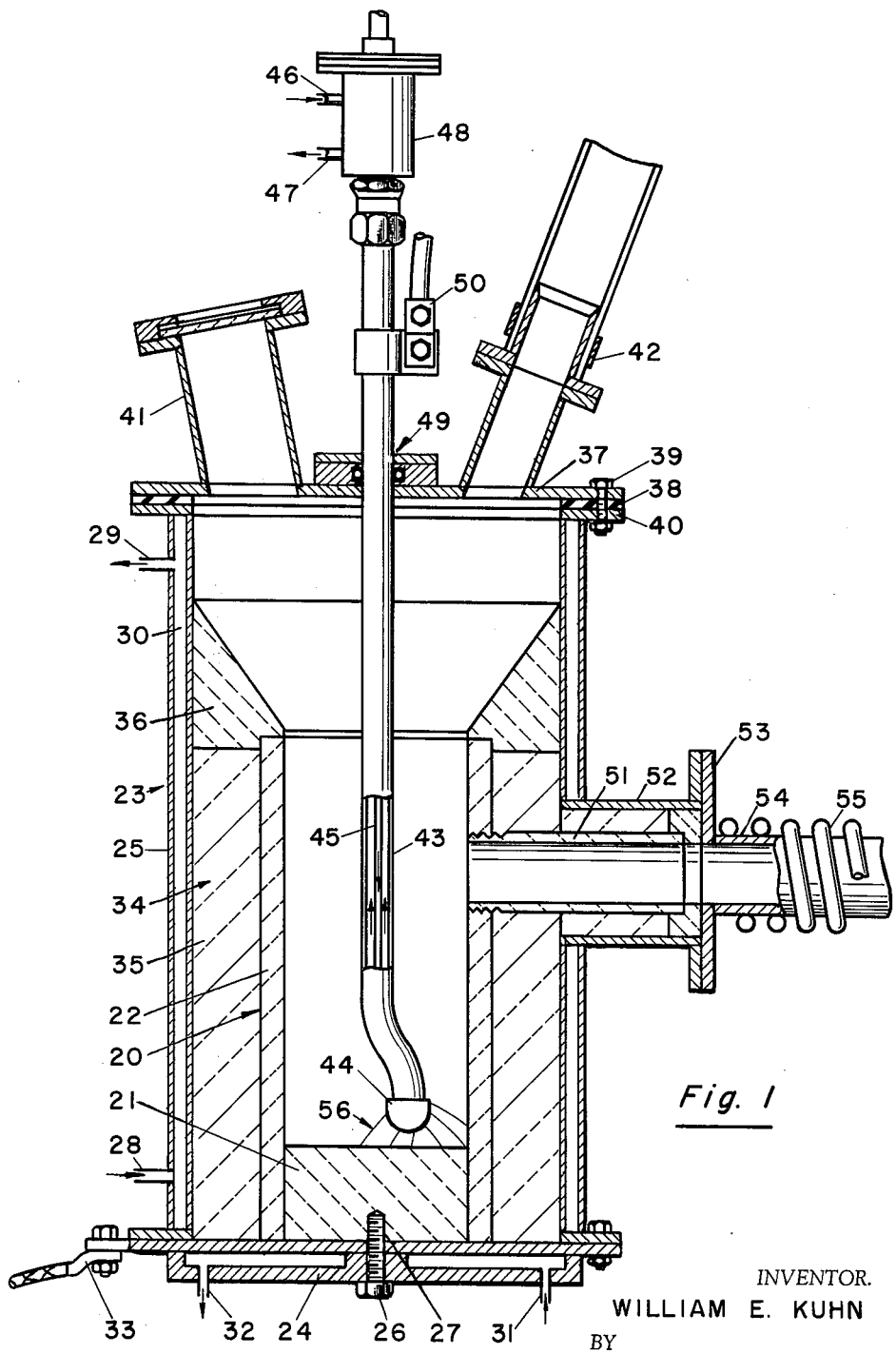
FIGURE 1 is a section view of one form of the apparatus of this invention.

Referring now to the apparatus of this invention, FIGURE 1 shows a furnace or reactor particularly adapted to the production of submicron, particulate refractory materials wherein all the reactants are fed to the reactor in finely-divided or pelletized solid form. A reaction chamber 20 of restricted volume is formed by a circular bottom wall or hearth 21 and a cylindrical side wall 22 which are fabricated of graphite. The lower portion of the side wall fits around and firmly engages the edges of the hearth 21. A steel casing 23 surrounds the reaction chamber 20 and is fastened to the reaction chamber by a bolt 26 which extends through base 24 of the casing and engages a threaded recess 27 in the hearth 21.

The casing is preferably water-cooled; therefore, the side wall 25 is hollow, providing a coolant space 30 through which water is circulated from inlet 28 to outlet 29. Similarly, the base of the casing is provided with a coolant space through which water may be circulated from inlet 31 to outlet 32. The base 24 of the casing is also provided with an electric terminal 33 for connection to a source of current.

A high temperature insulation material 35, such as powdered carbon, is inserted in annular space 34 between the casing 23 and the reaction chamber 20. A tapered ring 36 of solid graphite fits around the top of the reaction chamber 20 and over insulation material 35 and snugly engages the side wall 25 of the casing. A steel top 37 is fastened to the top of the casing by bolts 39 which pass through the top and a flange 40 around the top of the casing side wall 25. An annular washer 38 made of any suitable electrical insulation material separates the top from the casing. The bolts 39 are also electrically insulated from the casing. Thus the top 37 is completely insulated from the casing which is connected to a source of electricity through terminal 33.

An electrode 43 extends coaxially into the reaction chamber through an opening in the top 37 of the casing. An O-ring seal 49 maintains the casing gas-tight. The electrode, which is made of a good conductor such as copper having a graphite tip 44 fastened thereto, should be of sufficient length to contact the bottom wall of the reaction chamber. The electrode is hollow to enable water cooling thereof. A small tube 45 positioned coaxially inside the hollow central portion of the electrode is attached to water inlet 46. The tube 45 carries cooling water nearly to the tip of the electrode. The water then passes upward between the inner walls of the electrode and the tube 45 to water outlet 47.

The electrode is connected to a source of power through cable attachment 50. Thus the electrode is one terminal of an electric potential and the side and the bottom walls of the reaction chamber the other terminal.

The top of the electrode is connected through coupling 48 to means for raising and lowering the electrode in relation to the bottom wall of the reaction chamber. Thus, an arc may be developed between this electrode and the bottom wall of the reaction chamber by touching the bottom wall with the electrode tip and then withdrawing the electrode.

The electrode 43 is offset adjacent its tip and a means for rotating the electrode is connected to the top of the electrode through coupling 48. As the electrode is rotated, the tip 44 will describe a circular path adjacent the bottom wall 21 of the reactor. Accordingly, an arc may be developed between the tip of the electrode and substantially all the bottom wall 21 of the reactor chamber. Some arcing may occur between the electrode and the side walls 22 of the reaction chamber. Such arcing is kept to a minimum by limiting the extent of the offset so that it is always closer to the bottom wall than to the side walls.

Inlet tube 42 is provided in the top 37 of the casing and is connected to the storage chamber and a mechanism for automatically feeding a controlled amount of feed to the reaction chamber. A sight tube 41 is also provided in the top of the casing.

An effluent tube 51 is provided in the reaction chamber wall 22 adjacent the top thereof. The tube may be made of graphite or metal and is attached to the wall by threading or any other suitable means. The effluent tube 51 extends through the wall of the casing 23 and a steel tube 52, attached to the wall 25 of the casing by welding or any other suitable means, surrounds the portion of the tube 51 extending through the wall of the casing. The steel tube 52 is separated from the effluent tube 51 by the insulation 35. An aperture plate 53 caps the steel tube 52. A second product effluent tube 54 is fastened thereto and is surrounded by a cooling coil 55.

To operate the reactor for the preparation of submicron particulate refractories, the power is turned on and the electrode brought into contact with the bottom wall of the reaction chamber to generate an arc. Then the pelletized feed materials are introduced into the reaction chamber through the inlet tube at a metered rate. The feed materials fall to the bottom of the reaction chamber and into the intense heat of the arc where they are vaporized. The vapors react with each other forming the submicron particulate refractory material which is withdrawn from the reaction zone through the effluent tube. An inert carrier gas may be admitted to the reaction chamber through the inlet tube to sweep the reaction product out of the reaction chamber through the product effluent tubes. In some operations no carrier gas is needed, the gases formed during the reaction expanding and carrying the reaction product out of the reaction chamber through the product effluent tube.

Figure 3:
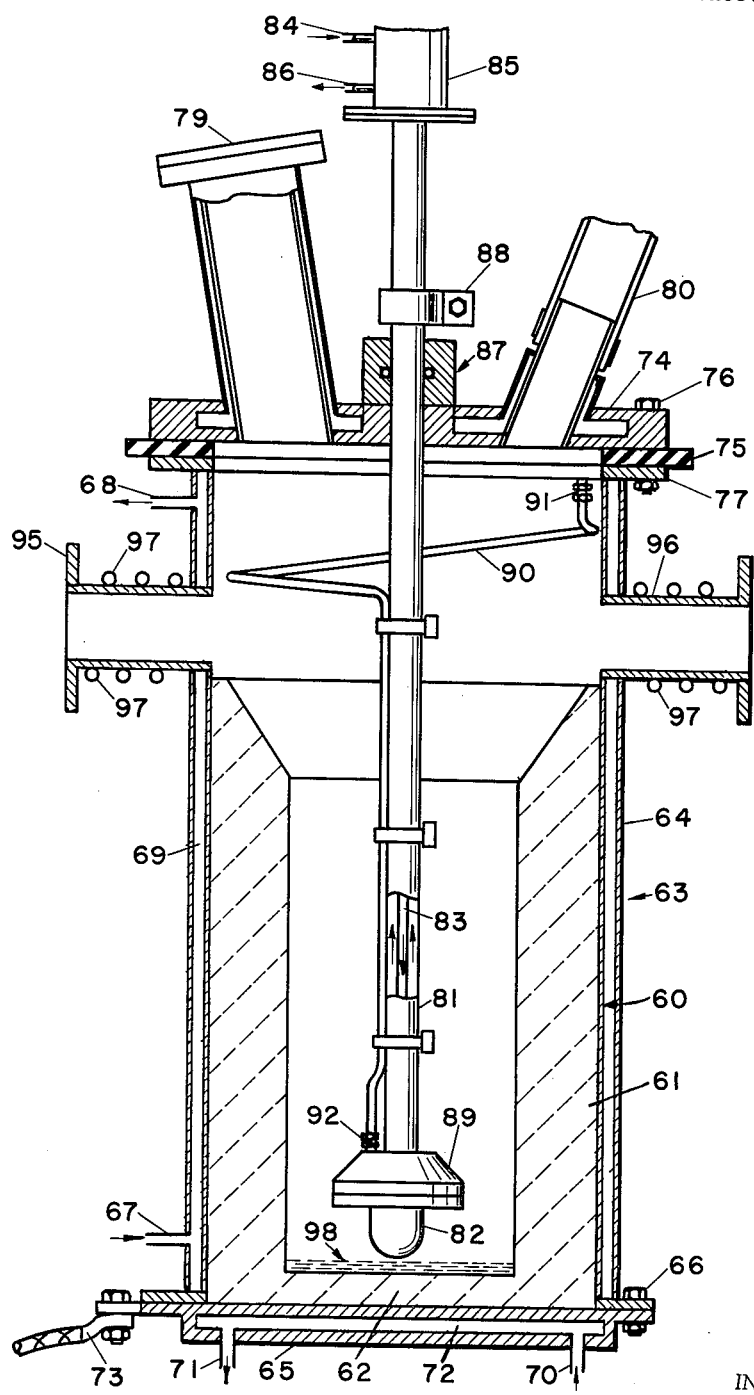
FIGURE 3 is a section view of a second form of apparatus of this invention.

In FIGURE 3, a modified form of the apparatus of this invention is shown which is specifically adapted for operations wherein at least one of the feed materials is introduced as finely divided solid material as granules or pellets and at least one other reactant is introduced in gaseous form. A cylindrical graphite reaction chamber 60, having integral side wall 61 and bottom wall 62, is fitted within a steel casing 63. The steel casing includes a hollow cylindrical wall 64 and a hollow circular base 65 fastened to the wall by bolts 66. Both the side and bottom walls of the casing are water-cooled, water passing from inlet 67 in the side wall through the hollow portion 69 of the wall to water outlet 68 and water passing from inlet 70, through the hollow portion 72 of the bottom wall of the steel casing to water outlet 71. The base is provided with an electrical terminal 73 for connection to a suitable source of electric current.

Figure 5:
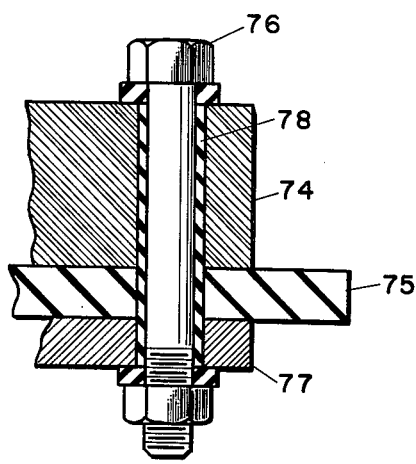
FIGURE 5 is an enlarged section of a bolt employed to fasten the top of a reactor casing.

A steel top 74 is fastened to the top of casing 63 by means of bolts 76 which pass through the top and a flange 77 formed around the top of the casing 63. An annular insulation ring 75 is positioned between and electrically separates the top 74 and flange 77. Bolts 76 are electrically insulated from the casing by insulation material 78 as shown in FIGURE 5. Thus the top 74 and the remainder of the casing are completely electrically insulated from each other. A sight tube 79 and a feed tube 80 are provided in the top 74 of the casing.

An electrode 81 extends coaxially into the reaction chamber through sliding seal 87, and is of sufficient length so that the tip can touch the bottom wall of the reaction chamber. The top of the electrode is connected through coupling 85 to a means for raising or lowering the electrode. The electrode, which is made of a good conductor such as copper, is hollow and has a graphite tip 82 attached to the end adjacent the bottom wall of the hearth. The sliding seal 87 makes the casing gas-tight and allows for adjustment of the distance between the tip and the bottom wall of the reactor. A power cable attachment 88 fastened to the electrodes is provided for connection with a source of current.

Figure 4:
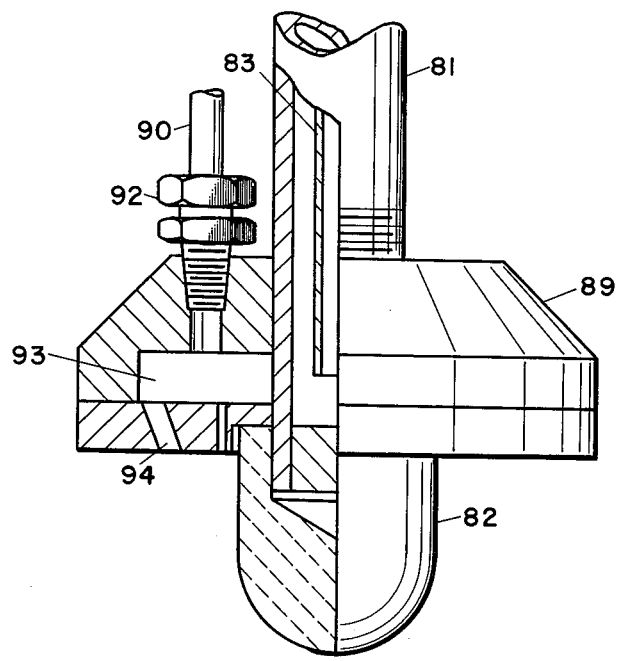
FIGURE 4 is an enlarged detail, partly in section, of the electrode tip assembly shown in FIGURE 3.

The electrode is water cooled. A hollow tube is positioned in the hollow central portion of the electrode and extends nearly to the tip of the electrode as shown in FIGURE 4. Tube 83 is connected to water inlet 84 and carries water to the tip of the electrode. The cooling water then circulates between the inner wall of the electrode and the outer wall of tube 83 to water outlet 86.

A gas conduit 90, connected to a union 91 at the top of the casing, carries gaseous feed material to the tip of the electrode. A gas distribution hood 89, best seen in FIGURE 4, is fastened to the electrode adjacent the tip and gas conduit 90 is connected to the hood 89 by a coupling 92. The gas distribution hood 89 includes a manifold passage 93 with a plurality of gas outlets 94 spaced around the electrode tip, and is thereby adapted to provide a sheath of gas around the tip.

In this embodiment of the invention the electrode is straight and the tip is not offset. However, the arc may be developed between the tip and substantially all of the bottom wall by utilizing a magnetic flux or mechanical means to rotate the arc.

A sweep or carrier gas inlet 95 is provided in the upper portion of the casing above the upper edge of the reactor chamber to direct an inert gas across the reactor and into an effluent tube 96 positioned in the upper portion of the casing above the upper edge of the reactor chamber directly across from the gas inlet. Both the sweep gas inlet and the effluent tube are surrounded by cooling coils 97 to prevent melting and damage occasioned by the intense heat of the reactor. The effluent tube 96 leads to the product recovery equipment such as a cyclone recovery system.

The operation of this embodiment of the invention is similar to the operation of the embodiment shown in FIGURE 1 and described above. After an arc is developed between the tip of the electrode and the bottom wall of the reaction chamber, granular feed materials are introduced through the feed inlet. The feed drops to the bottom of the reaction chamber, is melted and vaporized. A gaseous feed is introduced through the gas conduit and forms a sheath around the electrode tip. The vapors react forming a particulate refractory material which is swept from the reaction chamber.

The following specific examples illustrate and highlight the production of submicron refractory particulate utilizing the process and apparatus of this invention.

Example 1

A graphite reactor chamber having an inside diameter of 5⅝ inches and a height from hearth of 6½ inches was positioned within an insulated steel casing having a 12 inch inside diameter and a 24 inch height. Through the top of the casing was inserted a water-cooled electrode comprising a one-inch outside diameter copper tube provided with a solid graphite tip 1¼ inches outside diameter, extending about three inches from the lower extremity of the copper tube.

With the apparatus assembled for operating, power was turned on and an arc struck between the electrode tip and the bottom wall of the reactor chamber by touching the electrode tip to the bottom wall of the reaction chamber. The following conditions prevailed:

Operating open circuit voltage _____volts__ 150
Operating voltage _____do____ 55–95
Current _____amperes__ 200–400

A feed material consisting of 3/16 inch pellets of admixed silica and carbon in a ratio of 62.48% by weight silica and 37.52% by weight carbon was metered into the reaction chamber. After a run of sixty-six minutes, 300 grams of product was recovered. A significant amount of product was retained within the reactor and collection system. During the run the product was observed to rise as a cloud of fine particulate material from the reaction zone. The product was of submicron particle size, and had the following analysis: Silicon carbide — 96.4% by weight; silica (determined by infra-red techniques)— 6.8% by weight.

Example 2

A graphite reactor having an internal diameter of 1¾ inches and a height of three inches was positioned within a graphite casing with about 2¼ inch inside diameter and 5 inch height. A water cooled electrode having an outside diameter of ½ inch was inserted through the top of the casing. The electrode was fitted with a graphite rod tip 5 inches in length and having a ½ inch outside diameter.

With the apparatus assembled, the power was turned on and an arc struck between the electrode tip and the bottom wall of the reactor chamber utilizing 50 to 60 volts and a current of 110 to 120 amperes.

Feed materials consisting of ammonia gas and a pelletized mixture of 50 grams of carbon and 194 grams of boric oxide were metered into the reaction chamber for a 14.5 minute run. The ammonia was supplied in excess of that required by stoichiometric proportions to produce boron nitride. The grayish white product recovered contained 38.1% by weight nitrogen which, by calculation, showed 66.8% by weight boron nitride.

In the embodiments described, the furnace acts as one side of the potential However, a second electrode extending into the reaction chamber could be used instead of the walls of the furnace. The electrodes used are nonconsumable, none of the reactants being formed as part of electrodes. The electrodes are utilized only for forming the high temperature arc.

A fundamental feature of this invention is the release of a high level of energy per unit volume in a confined space to create a high temperature reaction zone capable of vaporizing one or more reactants to promote high speed reactions with the formation of submicron particulate refractories. Hence the use of a small reaction chamber wherein an arc is formed and which provides a confined reaction zone wherein temperatures are maintained at levels capable of vaporizing solid reactants is essential to the invention.

The reaction takes place in the lower confines of the reaction chamber, the chamber being the anode of a direct current arc. Single phase or three phase alternating current may also be used in this process. If three phase alternating curent is used, the arc will be rotated by reason of the use of three phase current and no independent means of rotating the arc is required.

The reactants are fed into the reaction chamber in such a way that the arc length and voltage remain relatively constant. The gas tight furnace facilitates purging of the reaction chamber, prevents contamination by the outside atmosphere and avoids the potential hazard of an explosive mixture forming in the reaction chamber.

The rapid ejection of the product effluent from the restricted area of the reaction zone into the larger space of the reaction chamber where the vapors cool by radiation and convection with or without the aid of cool sweep gases supplied to the chamber is itself an important feature of the invention. The effluent tube may lead the products into a slow cooling zone or a shock cooling zone. There is evidence that the crystal configuration of the product can be selectively controlled by either slow cooling or shock cooling.

One additional important feature of this process is that the by-product gases formed during the reaction may be recovered and utilized. The by-product may be of substantial commercial value and the ability to recover and utilize the by-product can substantially reduce the overall cost of the process.

While the present invention has been described in connection with the presently preferred embodiments thereof, it is subject to reasonable modifications, such are to be included within the scope of the invention as defined by appended claims.

I claim:
1. A method of making finely divided silicon carbide of submicron particle size which comprises, creating a high temperature arc in an enclosure of restricted volume to form a high temperature reaction zone between non-consumable electrodes, introducing silica and carbon in loose finely divided solid form into said reaction zone, vaporizing the silica and carbon by the thermal energy generated by said arc, reacting the resulting vapors within said reaction zone to form a finely divided silicon carbide of submicron particle size, and withdrawing the silicon carbide from the reaction zone.

2. A method of making silicon carbide of submicron particle size which comprises, creating a high-temperature arc in an enclosure of restricted volume to form a high temperature reaction zone, said arc being drawn between a wall of said enclosure and a non-consumable electrode extending into the enclosure, introducing silica in loose, finely divided solid form into said reaction zone, vaporizing the silica by the thermal energy generated by said arc, introducing a source of carbon vapors into the reaction zone, reacting the vapors within said reaction zone to form a silicon carbide of submicron particle size, and withdrawing the silicon carbide from the reaction zone.

3. A method of making boron nitride of submicron particle size which comprises, creating a high temperature arc in an enclosure of restricted volume to form a high temperature reaction zone between non-consumable electrodes, introducing boric oxide in loose, granular solid form into the reaction zone, vaporizing the boric oxide by the thermal energy generated by said arc, introducing a reactive nitrogenous gas into said enclosure, reacting said vapors and said gas within said enclosure to form boron nitride of submicron particle size, and withdrawing the boron nitride from the reaction zone.

4. A method of making finely divided refractory material of the group consisting of carbides and nitrides of submicron particle size which comprises creating a high-temperature arc in a reaction zone of restricted volume to form a high-temperature reaction zone between non-consumable electrodes, introducing reactants which are thermally reactive to form said refractory material, at least one of which is in loose, finely divided solid form, into said reaction zone, maintaining the temperature in said reaction zone at a level capable of vaporizing solid reactants, vaporizing the reactants by the thermal energy created by said high-temperature arc, reacting the vapors in said reaction zone to form a finely divided refractory material of submicron particle size, and withdrawing said refractory material from said reaction zone.

5. The method as defined in claim 4 in which said high-temperature arc is drawn between a wall of said reaction chamber and a non-consumable electrode extending into said chamber.

6. The method as defined in claim 4 in which all of said reactants are introduced into said reaction zone in solid, finely-divided pelletized form, said reactants being vaporized by the thermal energy created by said high-temperature arc.

7. The method as defined in claim 4 in which one of said reactants is introduced into said reaction zone in gaseous form, the vaporized solid reactant reacting with the gaseous reactant to form said refractory material of submicron particle size.

8. The method as defined in claim 4 in which said reactants are introduced into said reaction zone at a controlled rate in order to maintain the arc length and voltage relatively constant.

9. The method as defined in claim 4 in which said refractory material of submicron particle size is removed from said reaction zone by a gas.

References Cited by the Examiner

UNITED STATES PATENTS

| | | | |
|---|---|---|---|
| 503,558 | 8/1893 | Solvay | 23—1 |
| 1,054,372 | 2/1913 | Tone et al. | 23—208 |
| 1,169,817 | 2/1916 | Helfenstein | 23—191 X |
| 1,889,907 | 12/1932 | Terry | 13—9 |
| 2,047,354 | 7/1936 | Booth | 23—1 |
| 2,207,746 | 7/1940 | Maier | 13—9 |
| 2,399,951 | 5/1946 | Suits | 204—325 |
| 2,862,792 | 12/1958 | Rehm | 13—9 X |
| 2,863,738 | 12/1958 | Van Antwerp | 23—277 |
| 2,912,311 | 11/1959 | Mason et al. | 23—277 |
| 2,952,598 | 9/1960 | Suchet | 204—164 |
| 2,952,599 | 9/1960 | Suchet | 204—164 |

OTHER REFERENCES

Kroll et al.: "Recent Progress in the Metallurgy of Malleable Zirconium," Transactions of the Electrochemical Society, volume 92, pages 99–103, 1947.

MAURICE A. BRINDISI, *Primary Examiner.*